United States Patent
Rakich et al.

(10) Patent No.: US 8,189,257 B2
(45) Date of Patent: May 29, 2012

(54) OPTIMIZED CASCADED RAMAN FIBER-BASED LASER SOURCE FOR HIGH EFFICIENCY MID-INFRARED SPECTRAL GENERATION

(75) Inventors: Peter T. Rakich, Albuquerque, NM (US); Marin Soljacic, Belmont, MA (US); Yoel Fink, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 453 days.

(21) Appl. No.: 12/433,980

(22) Filed: May 1, 2009

(65) Prior Publication Data
US 2010/0079853 A1   Apr. 1, 2010

Related U.S. Application Data

(60) Provisional application No. 61/049,509, filed on May 1, 2008.

(51) Int. Cl.
*H01S 3/067* (2006.01)
*H01S 3/108* (2006.01)
*H01S 3/131* (2006.01)

(52) U.S. Cl. .......... 359/337.5; 359/337.4; 372/3; 372/6; 372/29.02

(58) Field of Classification Search ............... 359/337.4, 359/337.5; 372/3, 6, 29.02; H01S 3/067, H01S 3/108, 3/30, 3/131
See application file for complete search history.

(56) References Cited

U.S. PATENT DOCUMENTS

| | | | | |
|---|---|---|---|---|
| 5,136,599 A * | 8/1992 | Wilcox | .......................... | 372/26 |
| 6,215,929 B1 * | 4/2001 | Byron | ........................... | 385/37 |
| 6,340,806 B1 * | 1/2002 | Smart et al. | .............. | 219/121.62 |
| 6,396,623 B1 * | 5/2002 | Wysocki et al. | ............ | 359/337.4 |
| 6,437,906 B1 * | 8/2002 | Di Pasquale et al. | ...... | 359/337.2 |
| 6,462,862 B2 * | 10/2002 | Kinoshita | ...................... | 359/334 |
| 6,646,789 B2 * | 11/2003 | Kelkar et al. | .............. | 359/337.1 |
| 6,885,683 B1 * | 4/2005 | Fermann et al. | ................. | 372/25 |
| 6,996,308 B1 * | 2/2006 | Akasaka | ......................... | 385/24 |
| 7,508,853 B2 * | 3/2009 | Harter et al. | .................... | 372/30 |
| 7,991,022 B1 * | 8/2011 | Soh et al. | .......................... | 372/3 |
| 8,059,966 B2 * | 11/2011 | Igarashi et al. | ............... | 398/179 |
| 2002/0125228 A1 * | 9/2002 | Smart et al. | .............. | 219/121.62 |
| 2002/0162973 A1 * | 11/2002 | Cordingley et al. | ........ | 250/492.2 |
| 2004/0066550 A1 * | 4/2004 | Jay | .............................. | 359/337.1 |

(Continued)

FOREIGN PATENT DOCUMENTS

| JP | 11258647 | 9/1999 |
|---|---|---|
| KR | 20050119672 | 12/2005 |
| KR | 20060008888 | 1/2006 |

OTHER PUBLICATIONS

Stolen et al., "A Fiber Raman Ring Laser" IEEE Journal of Quantum Electronics, vol. QE-14, No. 11, Nov. 1978, pp. 860-862.

(Continued)

*Primary Examiner* — Mark Hellner
*Assistant Examiner* — Ari M Diacou
(74) *Attorney, Agent, or Firm* — Gesmer Updegrove LLP

(57) ABSTRACT

A laser structure is provided that includes a pulsed source producing a pulsed signal having a low spontaneous noise component to its spectral output and a pulse-shape that is optimally flat. Also, the laser structure includes one or more optical fiber structures receiving the pulsed signal and performing Raman amplification. The pulsed signal is used to excite in the one or more optical fiber structures possessing normal chromatic dispersion, which acts as a nonlinear system for efficient mid-infrared spectral generation.

20 Claims, 10 Drawing Sheets

U.S. PATENT DOCUMENTS

| | | | |
|---|---|---|---|
| 2004/0175174 A1* | 9/2004 | Suhami | 398/43 |
| 2006/0051100 A1* | 3/2006 | Watanabe | 398/152 |
| 2006/0120418 A1* | 6/2006 | Harter et al. | 372/30 |
| 2007/0280613 A1* | 12/2007 | Inoue et al. | 385/122 |
| 2008/0013163 A1* | 1/2008 | Leonardo et al. | 359/341.31 |
| 2008/0212978 A1* | 9/2008 | Boscolo et al. | 398/175 |
| 2009/0016388 A1* | 1/2009 | Gu et al. | 372/25 |
| 2009/0067842 A1* | 3/2009 | Blow et al. | 398/79 |
| 2010/0135340 A1* | 6/2010 | Kitabayashi | 372/6 |

OTHER PUBLICATIONS

Stolen et al., "Development of the stimulated Raman spectrum in single-mode silica fibers" J. Opt. Soc. Am. B., vol. 1, No. 4, Aug. 1984, pp. 652-657.

Cohen, "A Universal Fiber-Optic (UFO) Measurement System Based on a Near-IR Fiber Raman Laser" IEEE Journal of Quantum Electronics, vol. QE-14, No. 11, Nov. 1978, pp. 855-859.

* cited by examiner

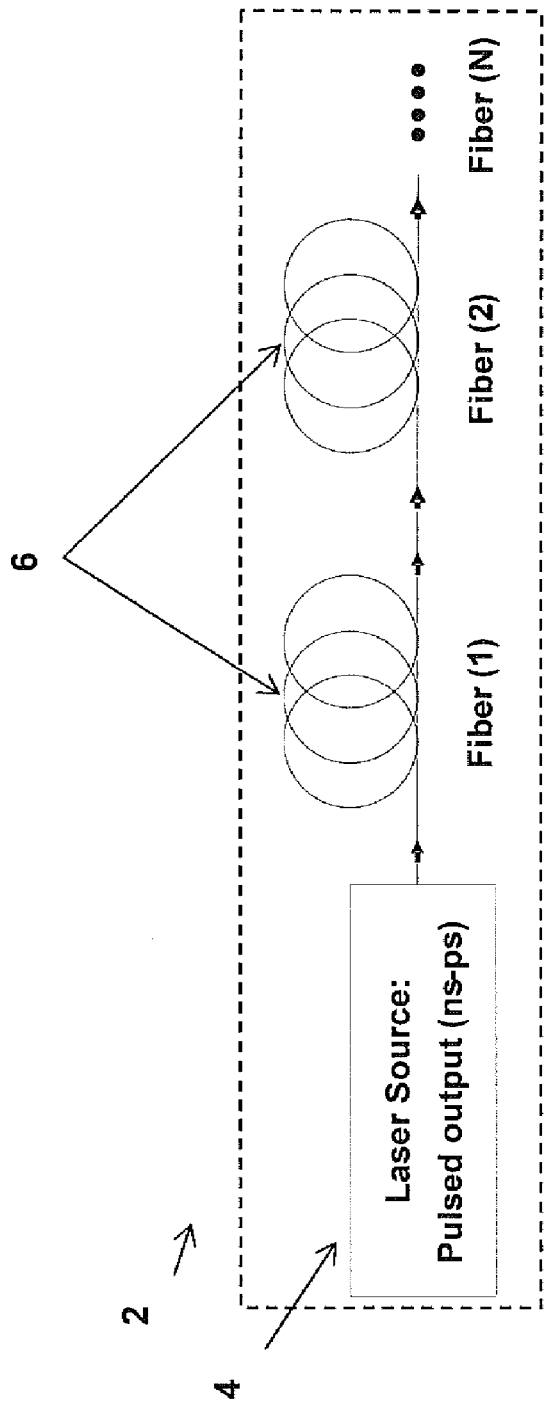
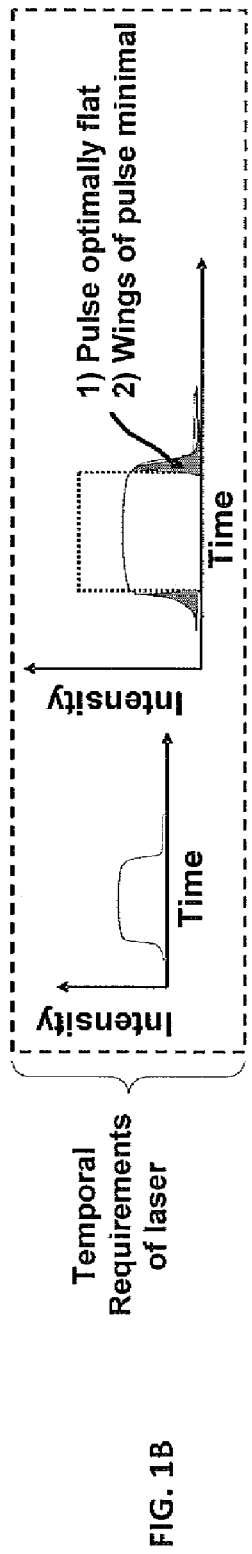
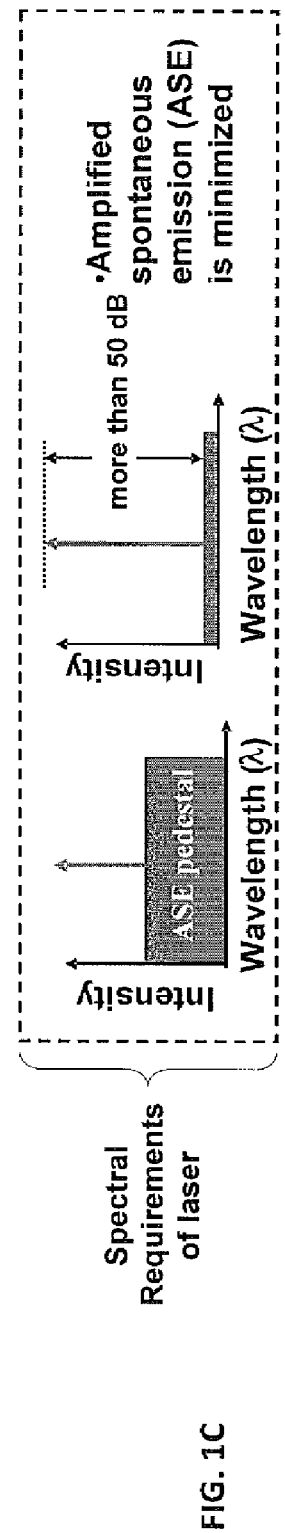
FIG. 1A
FIG. 1B
FIG. 1C

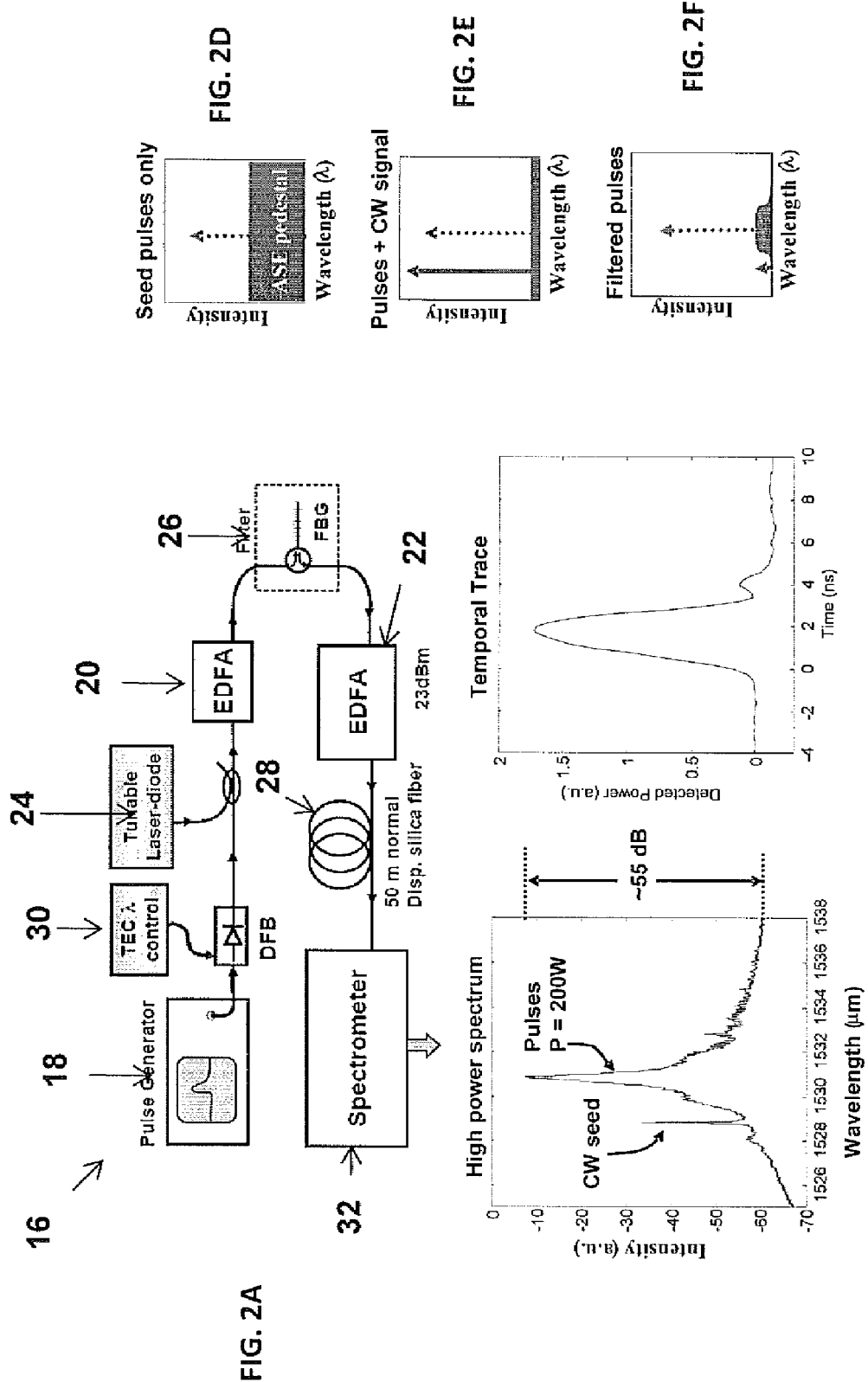

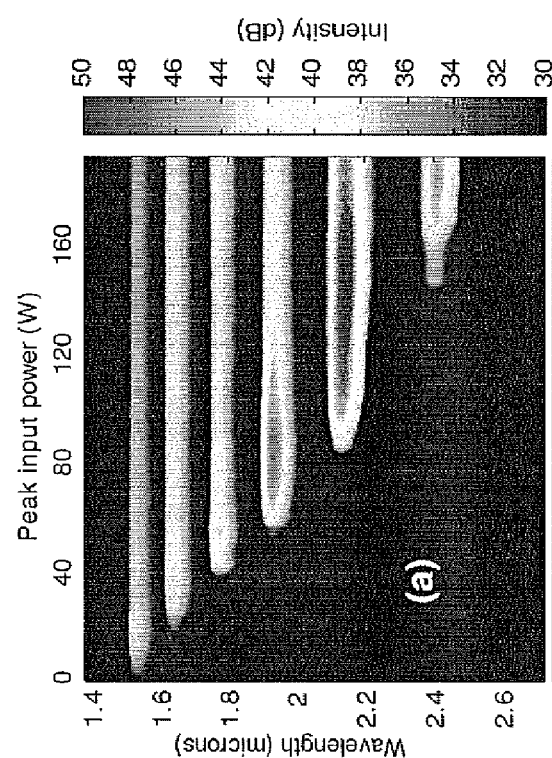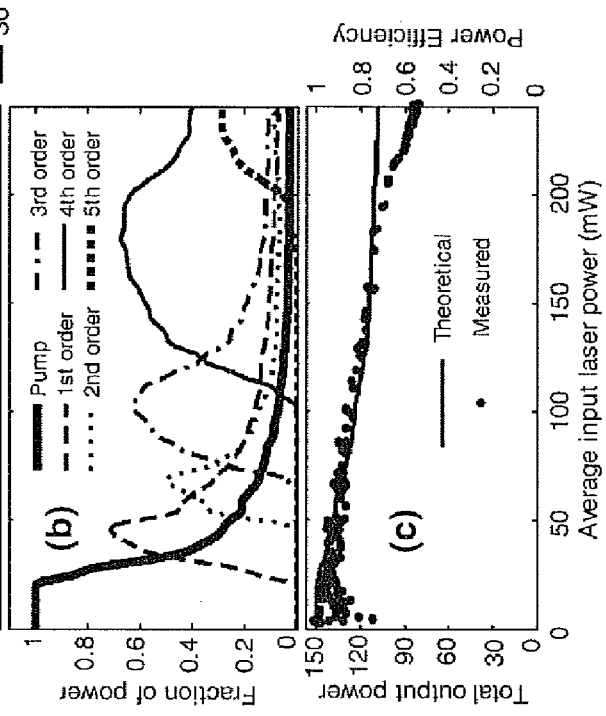
FIG. 4A  FIG. 4B  FIG. 4C

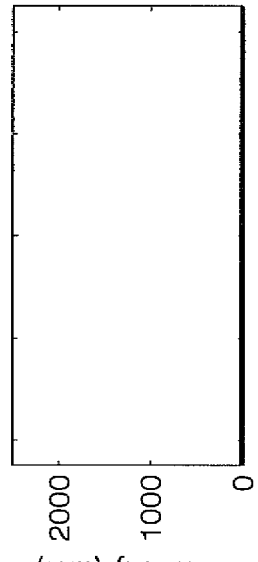
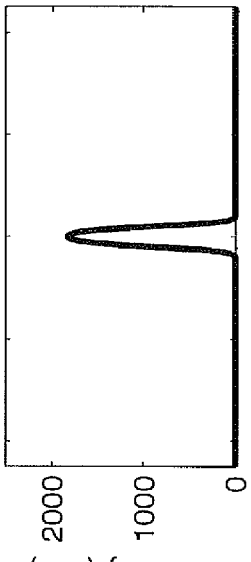
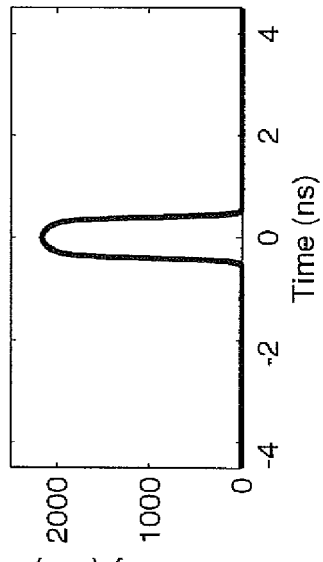
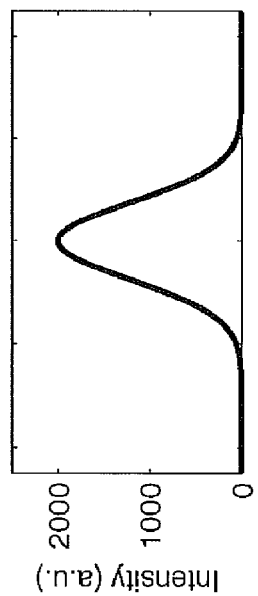
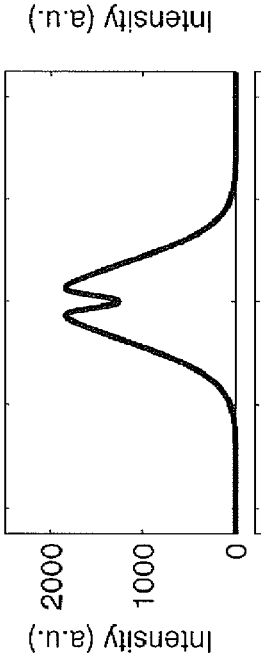
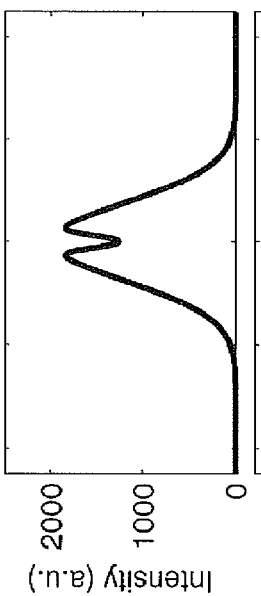
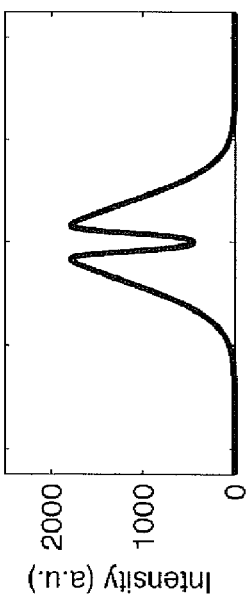
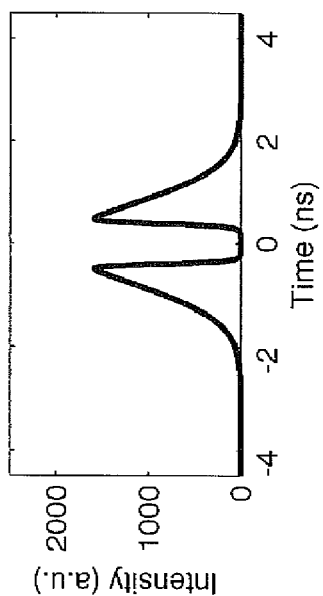
FIG. 6A  FIG. 6B
FIG. 6C  FIG. 6D
FIG. 6E  FIG. 6F
FIG. 6G  FIG. 6H

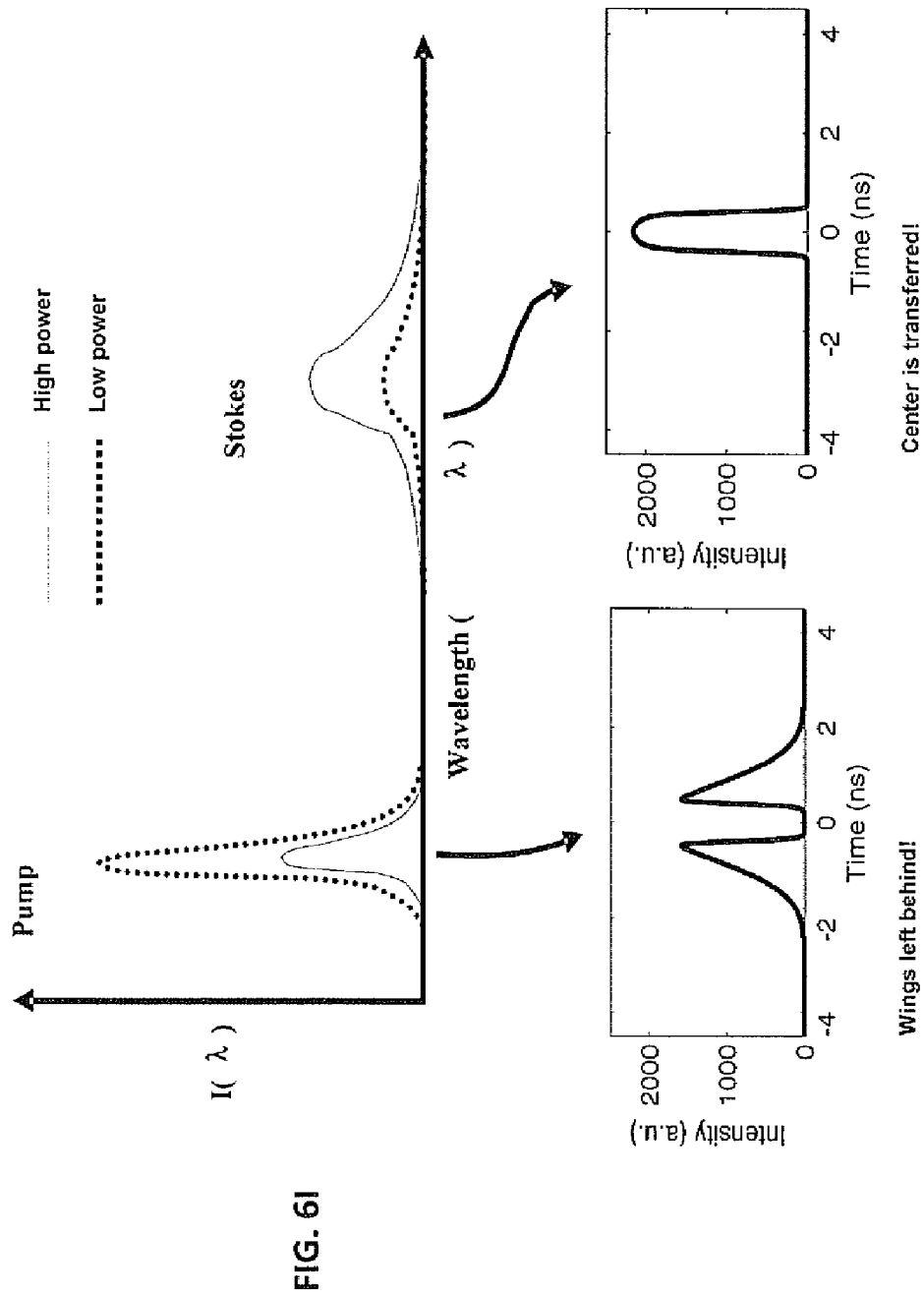

OPTIMIZED CASCADED RAMAN FIBER-BASED LASER SOURCE FOR HIGH EFFICIENCY MID-INFRARED SPECTRAL GENERATION

PRIORITY INFORMATION

This application claims priority from provisional application Ser. No. 61/049,509 filed May 1, 2008, which is incorporated herein by reference in its entirety.

GOVERNMENTAL SPONSORSHIP

This invention was made with government support awarded by the Army Research Office through The Institute for Soldier Nanotechnologies under Grant No. W911NF-07-D-0004 and the Air Force Research Laboratories under Grant No, FA8650-05-C-5426. The government has certain rights in the invention.

BACKGROUND OF THE INVENTION

The invention is related to the field of laser technology, and in particular to an optimized cascaded Raman fiber-based laser source for high efficiency mid-infrared spectral generation.

Light sources spanning mid-IR wavelengths are the subject of intense interest for applications such as semiconductor processing, coherent X-ray generation, chemical sensing and cancer detection. To this end, sources spanning mid-IR wavelengths have been developed in the form of quantum-cascade lasers, rare-earth doped fiber-gain media, and fiber-based supercontinuum sources.

It has been demonstrated that at high powers, substantial levels of Raman gain can be achieved through the use of conventional silica fibers to produce significant spectral redshifts through spontaneous cascaded Raman (CR) processes. Knowing this, the possibility of constructing simple and efficient Raman-based sources and gain-blocks for long-wavelength spectral generation seems promising. However, one's ability to continually red-shift through CR does suffer some practical limitations. Spectral broadening and pulse distortions due to both spontaneous Raman emission and four-wave mixing (FWM) generally limit the efficiency of this process.

For instance, at high powers, anomalous dispersion and Kerr nonlinearities can give rise to modulation instabilities (MI), which result in a significant spectral broadening and pulse distortion, unnecessarily stifling the efficiency of the cascaded Raman process. For this reason, normal dispersion fibers are more desirable for controlled and maximally efficient CR at the nanosecond time-scale.

Unfortunately, silica fibers generally possess anomalous dispersion from 1.3 μms to 2.4 μm due to the presence of a strong mid-IR absorption resonances.

SUMMARY OF THE INVENTION

According to one aspect of the invention, there is provided a laser structure. The laser structure includes a pulsed source producing a pulsed signal having a low spontaneous noise component to its spectral output and a pulse-shape that is optimally flat. Also, the laser structure includes one or more optical fiber structures receiving the pulsed signal and performing Raman amplification. The pulsed signal is used to excite in the one or more optical fiber structures possessing normal chromatic dispersion, which acts as a nonlinear system for efficient mid-infrared spectral generation.

According to another aspect of the invention, there is provided a method of performing Raman amplification. The method includes providing a pulsed source producing a pulsed signal having a low spontaneous noise component to its spectral output and a pulse-shape that is optimally flat. Also, the method includes arranging one or more optical fiber structures to receive the pulsed signal. The pulsed signal is used to excite in the one or more optical fiber structures possessing normal chromatic dispersion, which acts as a nonlinear system for efficient mid-infrared spectral generation.

BRIEF DESCRIPTION OF THE DRAWINGS

FIGS. 1A-1C are schematic diagrams illustrating the invention and graphs illustrating temporal and spectral properties of a laser used in accordance with the invention;

FIGS. 2A-2F are schematic diagrams illustrating a system used in accordance with the invention and graphs illustrating the performance of the system;

FIGS. 4A-4C are graphs illustrating measured spectral intensity of the laser output versus wavelength (μm) and laser power and graphs illustrating the fraction of integrated laser power in each order versus incident laser power and measured total fiber output power vs input power;

FIGS. 6A-6K are graphs illustrating the temporal evolution of the pump pulse, the pulse evolution of the pulse generated in the first stokes, and the correspondence of the resulting pulse shapes with different parts of the laser spectrum;

DETAILED DESCRIPTION OF THE INVENTION

Figures 3A, 3B, 3C:
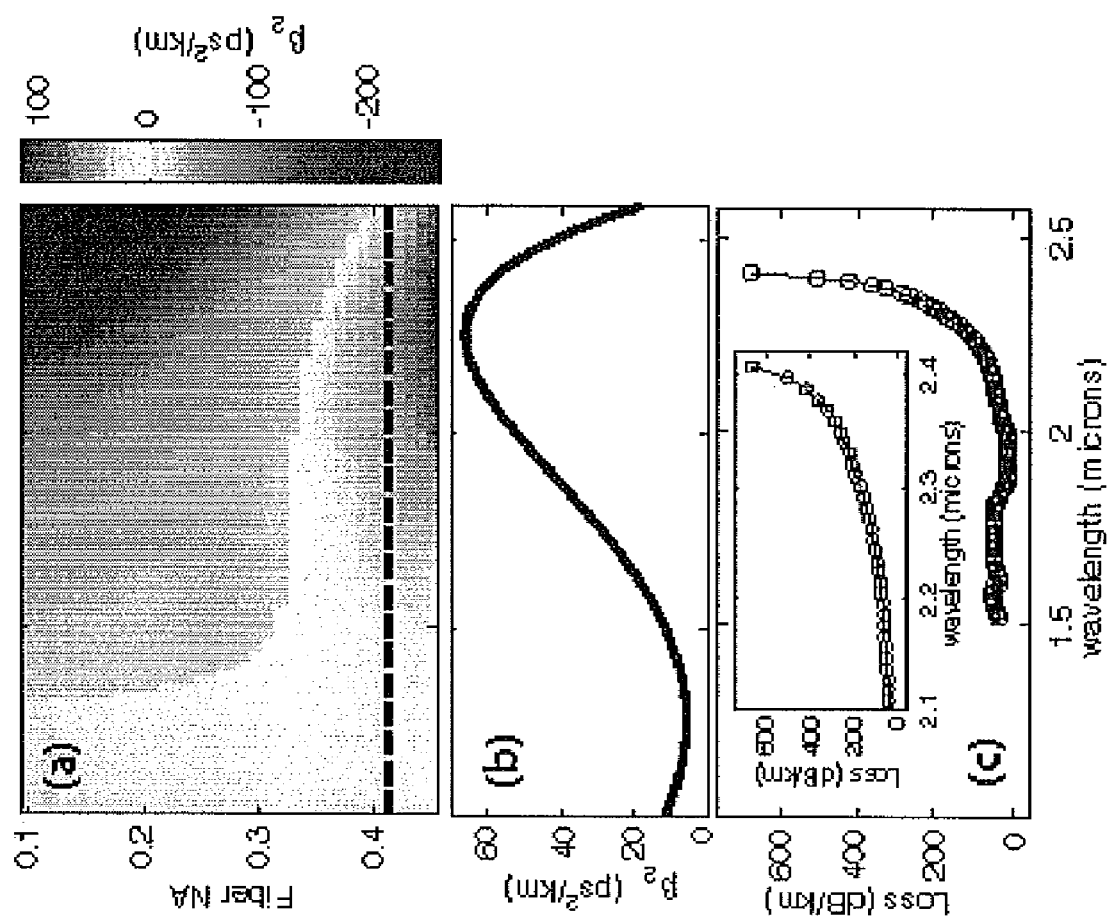
FIGS. 3A-3C are graphs illustrating dispersion versus NA and wavelength for a silica fiber and graphs illustrating total dispersion and measured loss of the silica fiber.

The invention allows for generating very high efficiency spectral red-shifting of light from short wavelengths (or high frequencies) to longer wavelengths (or lower frequencies) using Raman amplification produced within optical fibers. The invention includes a pulsed source having a low spontaneous noise component to its spectral output, and a pulse-shape that is optimally flat (or rectangular), with a minimal component of optical power distributed within the wings of the pulse (within the physical constraints of the methods for the generating these pulses). When such pulses are used to excite normal dispersion in the optical fiber, which acts as the nonlinear system for spectral generation, the invention enables efficient mid-infrared spectral generation (approaching 100% photon-yield).

FIG. 1A shows the essential outline 2 of the invention, which includes a pulsed laser source 4 which is coupled to a fiber or series of fibers 6. FIG. 1B illustrates the important temporal characteristics of laser source. Pulses which are rectangular, and have a minimal fraction of power contained in the wings are optimal. FIG. 1C illustrates the crucial spectral characteristics of the laser source. A laser spectrum with as little spectrally-broad amplified spontaneous emission is optimal. Such undesirable broadband emission can be amplified or created by nonlinear processes within a laser cavity as well, and should be minimized also.

The amplified spontaneous emission (ASE) component of the laser's spectral output must have a small component of total laser output power, preferably less than one part in 1000. For example, it is optimal for all of the laser power to be contributed by the laser pulses, not a broadband ASE component. The pulse spectrum must be spectrally much narrower than the Raman gain bandwidth to maximize the Raman gain. The pulse bandwidth must be spectrally broad enough to inhibit Stimulated Brillouin Scattering (SBS) (for a given peak power and pulse-width).

Spectral broadening of laser-line within the laser 4 must be mitigated by reducing nonlinearities, which contributed to FWM and self-phase modulation (SPM) and modulation instability (MI). For instance, one can use normal group velocity dispersion (GVD) and/or large-core fibers to amplify the signal. Furthermore, narrow spectral filtering can be implemented to suppress ASE which is generated within (or just outside) the laser cavity with low-nonlinearity element such as fiber-Bragg-gratings, interference filters, gratings etc (preferably of normal dispersion as well). It is also required that the temporal shape of the pulses generated be optimally flat at their peak-power, with minimal power distributed to wings of pulse, as shown in FIG. 1B. When such pulses of low ASE component, narrow spectral width, high peak power, and optimally flat, or rectangular, pulse profile are used to excited a (nonlinear) fiber with normal GVD, efficient spontaneous cascaded Raman amplification occurs when the losses (or effective length) of such fibers produces sufficient Raman gain to transfer the pump wavelength to the stokes also referred to as the critical length for Raman power transfer. Any number of fibers with different materials and dimensions can be cascaded together to achieve a maximally long wavelengths via cascaded Raman amplification. Cascading fibers of different materials together is important since each material tends to have a limited band of spectral transparency.

The fiber-optic or other such waveguide 6 used as a nonlinear element to generate Raman gain can have a sufficient nonlinear length to generate significant levels of Raman gain for a given peak laser power. For each stokes-shift to occur, the fiber must have a nonlinear length corresponding to the critical length of Raman transfer. In particular, N stokes shifts would require a system which is at least N critical lengths long when a normal dispersion fiber is employed. Also, the fiber optic 6 can possess normal dispersion over wavelengths of use but need not possess normal dispersion over all wavelengths of transparency not in use. In addition, the fiber optic 6 can be constructed from any material such as glass, semiconductor, polymer or the like. Properties of the waveguide can be varying as a function distance along the fiber. Furthermore, the fibers under consideration can include step-index profile, graded index profile, multi-material cross-section, and may possess micro/nanostructuring to form a Bragg fiber or a photonic crystal fiber or non-periodic structures as well. The fiber or waveguide system 6 can include a number of concatenated fibers or waveguides of different geometries and materials.

Pulses can be obtained from the laser 4, e.g. laser diode, by modulation internally or externally with use of one or more of the following effects: gain modulation, electro-optic, acoustooptic, electroabsorption, passive or active Q-switching, mode-locking. Also, pulses generated by external or internal modulation can be tailored, for instance when addressable with an electrical signal with an arbitrary waveform generator, to take on a particular optimally flat pulse profile at the output of the laser by pre-distortion of the electrical driving signal to compensate for the response of the modulating element, and the stages of amplification which follow the pulse. After the optimal pulse shape is achieved through modulation, the optical pulse is amplified to high peak powers through one or more stages of amplification. Optical filters and temporal modulators can be used before and after stages of amplification to ensure low noise and optimal pulse shape. Low noise amplification of the laser pulses (up to high peak powers) can be achieved by a number of techniques including: pulse-picking, saturation of the optical amplifier with a continuous wave signal of similar wavelength, or temporal gating to reject amplified spontaneous emission. High power amplification can be achieved with low nonlinearity amplifiers, free-space, or fiber-based, after which additional filtering and modulation may be performed.

FIG. 2A shows a system 16 used for the generation of low noise nanosecond pulses. The system 16 includes a distributed feedback (DFB) laser diode 18 which is amplified through two stages 20, 22 of erbium doped fiber amplification (EDFA). The DFB laser 18, which generates the pulses, is wavelength stabilized and tuned with thermoelectric controller 30. Pulses are generated by externally modulation of the gain with nanosecond pulses from an electrical pulse generator. This produces spectrally narrow variable rep-rate nanosecond seed pulses. These seed pulses are then combined with a continuous wave (CW) signal from a tunable laser 24 of similar wavelength to ensure saturation of the first EDFA stage 20 (improving the noise figure of amplification). FIG. 2B shows the resulting amplified spectrum for peak powers of 200 W and average powers of 240 mW using the spectrometer 32 and FIG. 2C shows the measured pulse shape at the output of the laser.

The first EDFA stage 20 is used to boost the average power of the pulses to ~10 mW levels before they selectively spectrally filtered from the ASE background and the CW signal, as seen in FIGS. 2D-2F.

Low average power (microwatt) seed pulses of 2 nanosecond duration are generated by external electrical gain modulation of the distributed feedback (DFB) laser diode 18 of wavelength 1.53 microns. These seed pulses from the DFB laser 18 are then amplified through two stages 20, 22 of optical gain. In the first stage 20, the seed pulses, of 153.12 nm wavelength are co-propagated with a continuous-wave (CW) seed signal from a tunable laser source 24 (detuned from the DFB wavelength by 1 nm). The CW signal produces saturation of the amplifiers, ensuring a very low ASE component to the amplified seed signal.

Once the seed pulses reach 10 mW average power levels, a fiber Bragg-grating (FBG) 26 with a 10 GHz wide stop-band is used, in conjunction with a circulator, to spectrally filter the seed pulses from the amplified CW laserline and ASE background signals. With sufficient power to saturate the second stage 22 of erbium gain, the pulses are boosted to an average powers of 240 mW yielding an ASE component which is typically less than 1% of the total output power, and peak powers of 100 W-5 kW.

To produce spontaneous Raman energy transfer, the output of the high-power amplifier 28 is spliced to 50 meters of small-core normal-dispersion silica fibers (Nufern UHNA7). Through full-vectorial mode-solvers, this fiber 28 is identified as one which possesses normal dispersion over the entire window of silica transparency of silica since it possesses a numerical aperture (NA) of 0.41 and a cutoff wavelength of 1.45 microns. FIGS. 3A-3C show the computed dispersion and measured loss of this fiber.

FIG. 3A shows a graph illustrating dispersion versus NA and wavelength for a silica fiber with $\lambda c = 1.45$ μm. FIG. 3B illustrates the total dispersion for silica fiber with NA=0.41 and λc=1.45 µm, and FIG. 3C illustrates the measured losses for a NUFERN UHNA7 silica fiber.

For a repetition rate of 680 kHz, the laser output is measured with spectrometer and PbSe detector as a function of laser power. The spectral evolution of the resulting cascaded Raman process is summarized by the intensity map of FIG. 3A as the laser power is increased, showing significant and controlled spectral red-shifts through higher order cascaded Raman power transfer. As the laser power is increased one can see that the fundamental (1531 nms) pump wavelength is shifted in 14.7 THz (or 490 cm-1) steps 11, 16 to 1.64, 1.78, 1.94, 2.14, and 2.41 µm wavelength bands. While the spectral width of each successive order does broaden (primarily due to spontaneous Raman emission), the generated spectral bands are very clean showing negligible power shedding to continuum. Despite the high material losses of silica at 2.41 microns, a strong 5th Raman order is formed, producing significant power transfer.

Through this experiment, longest wavelength generated by this cascaded Raman process is only limited by the intrinsic material losses of the fiber-optic used in this case, and the maximum efficiency, as will be shown further, was only limited by the pulse shape.

FIG. 4A shows a graph illustrating the measured spectral intensity of the laser output versus wavelength (µm) and laser power. FIG. 4B illustrates the fraction of integrated laser power in each order versus incident laser power and FIG. 4C shows the measured (theoretically estimated) total fiber output power vs input power.

Figures 5A, 5B, 5C, 5D:
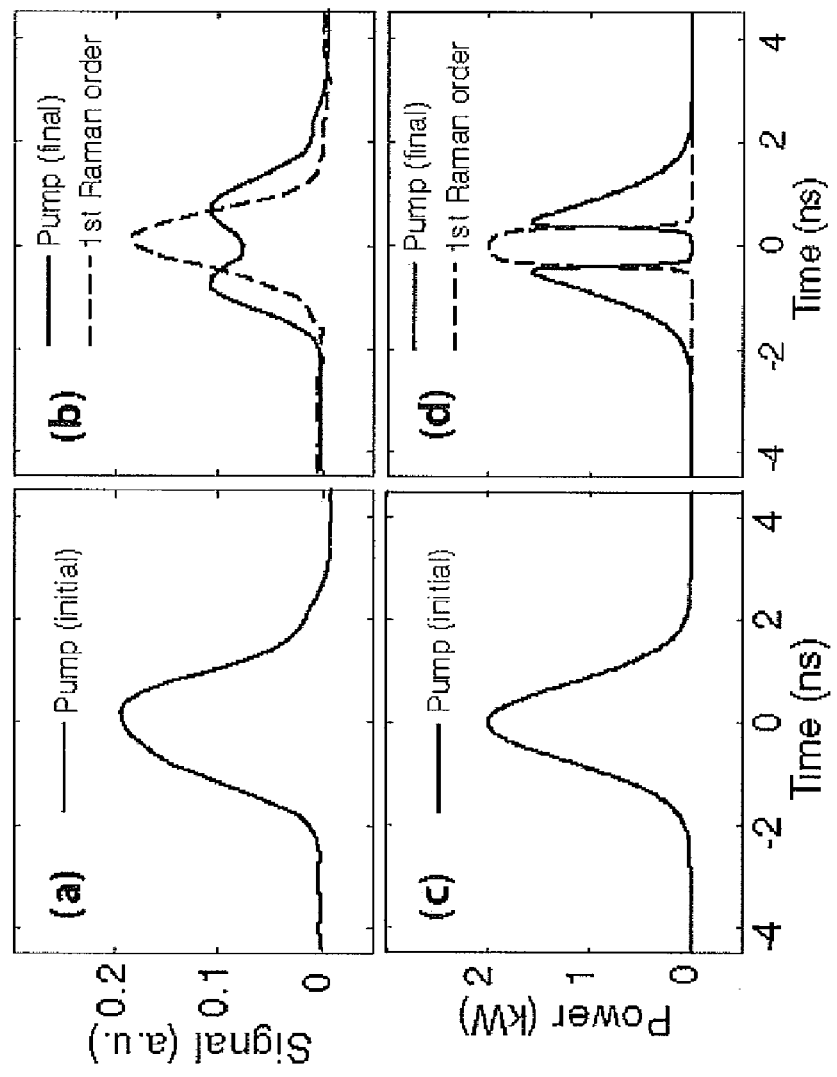
FIGS. 5A-5D are graphs illustrating the pulse profiles measured before and after first order cascaded Raman power transfer.

FIGS. 5A-5B show the pulse profiles measured before and after a first order cascaded Raman power transfer. FIGS. 5C-5D show simulated pulse profiles under similar conditions.

The key scientific insights, which allow the invention to approach 100% photon yield or high spectral conversion efficiencies in this cascaded Raman Laser system, are the temporal shape of the pulse used to produce spontaneous cascaded Raman power transfer poses a central limitation on the maximum efficiency of power transfer to any single wavelength band. To understand why this is, one can begin by explaining what happens to the pulse shape as power is spontaneously transferred from the pump wavelength to the Stokes wavelength through the cascaded Raman process.

The temporal evolution of the laser pulse through the spontaneous Raman process, which is key to understanding a fundamental limitation to the maximum efficiency of power transfer to any single wavelength band are examined. To begin, the evolution of a single pump pulse when it is coupled in to a fiber segment is examined. Initially, it is assumed that the pump pulse has a temporal width of 2 nanoseconds, and that there is negligible power at the Stokes wavelength.

In the interest of brevity, the formation of the first Raman order is discussed, investigating how it spontaneously builds to transfer power from the pump wavelength. One can easily see that, since Raman gain is proportional to the pump intensity, gain must be largest for times corresponding to peak of the laser-pulse. As a result, an apodized version of the incident pulse is generally transferred to the adjacent Raman order. This process is elucidated through simulated temporal pulse profiles for the pump and Stokes wavelengths, which are seen in FIGS. 6A, 6C, 6E and 6G show the temporal evolution of the pump pulse increase in peak power, while FIGS. 6B, 6D, 6F and 6H show the pulse evolution of the pulse generated in the first stokes order as it builds up. As the peak power of the pulse is increased, one can see that a larger portion of the incident pulse is transferred. These simulated pulse profiles reveal that the central portion of the pulse is transferred from 1.53 µm to 1.64 µm, leaving only the wings of the pulse behind.

FIGS. 6I-6K schematically show the correspondence of the resulting pulse shapes with different parts of the laser spectrum. These measurements agree well with temporal simulations, computed through coupled amplitude equations which incorporate self-phase modulation, cross-phase modulation and Raman terms, seen in FIGS. 5C-5D. Interestingly, the peak pulse intensity and pulse shape are essentially preserved, allowing the same process to occur numerous times, with a similar pulse shortening occurring at each stage.

Figures 7A, 7B, 7C, 7D:
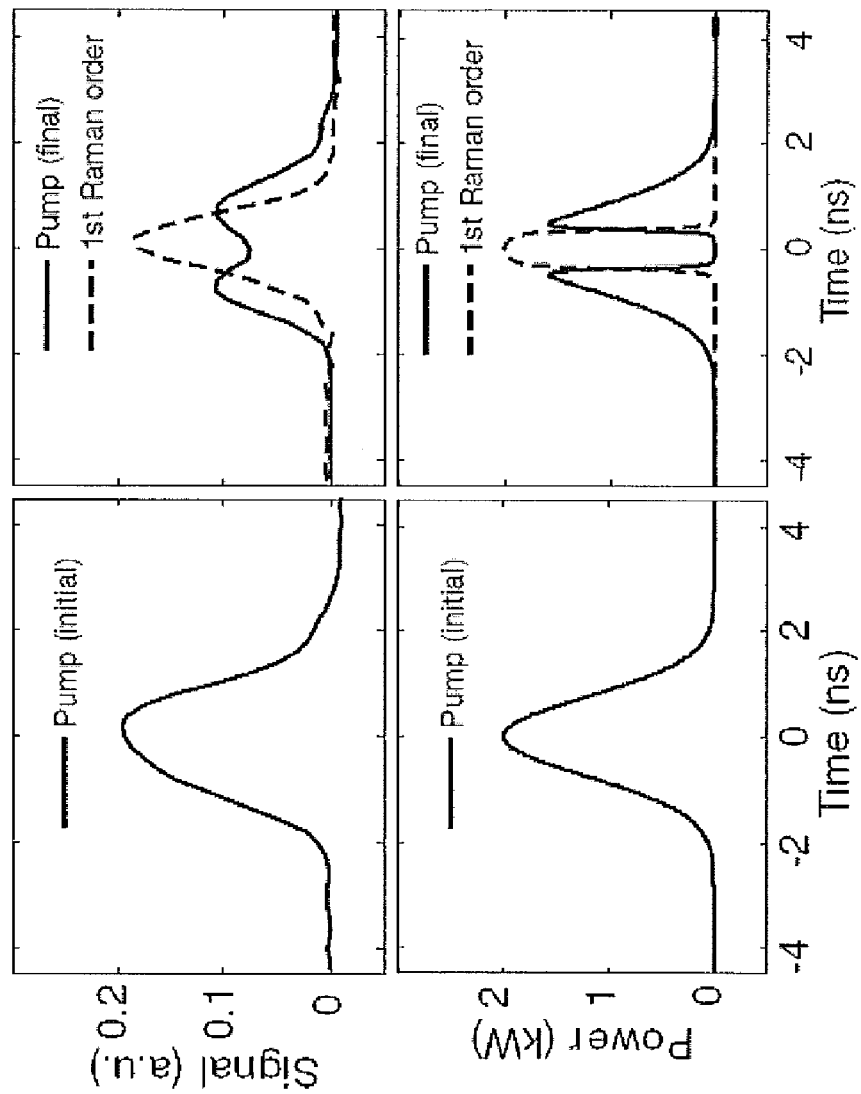
FIG. 7A-7G are graphs illustrating the pulse profiles measured before and after first order cascaded Raman power transfer and the correspondence of the resulting pulse shapes with different parts of the laser spectrum.
Figures 7E, 7F, 7G:
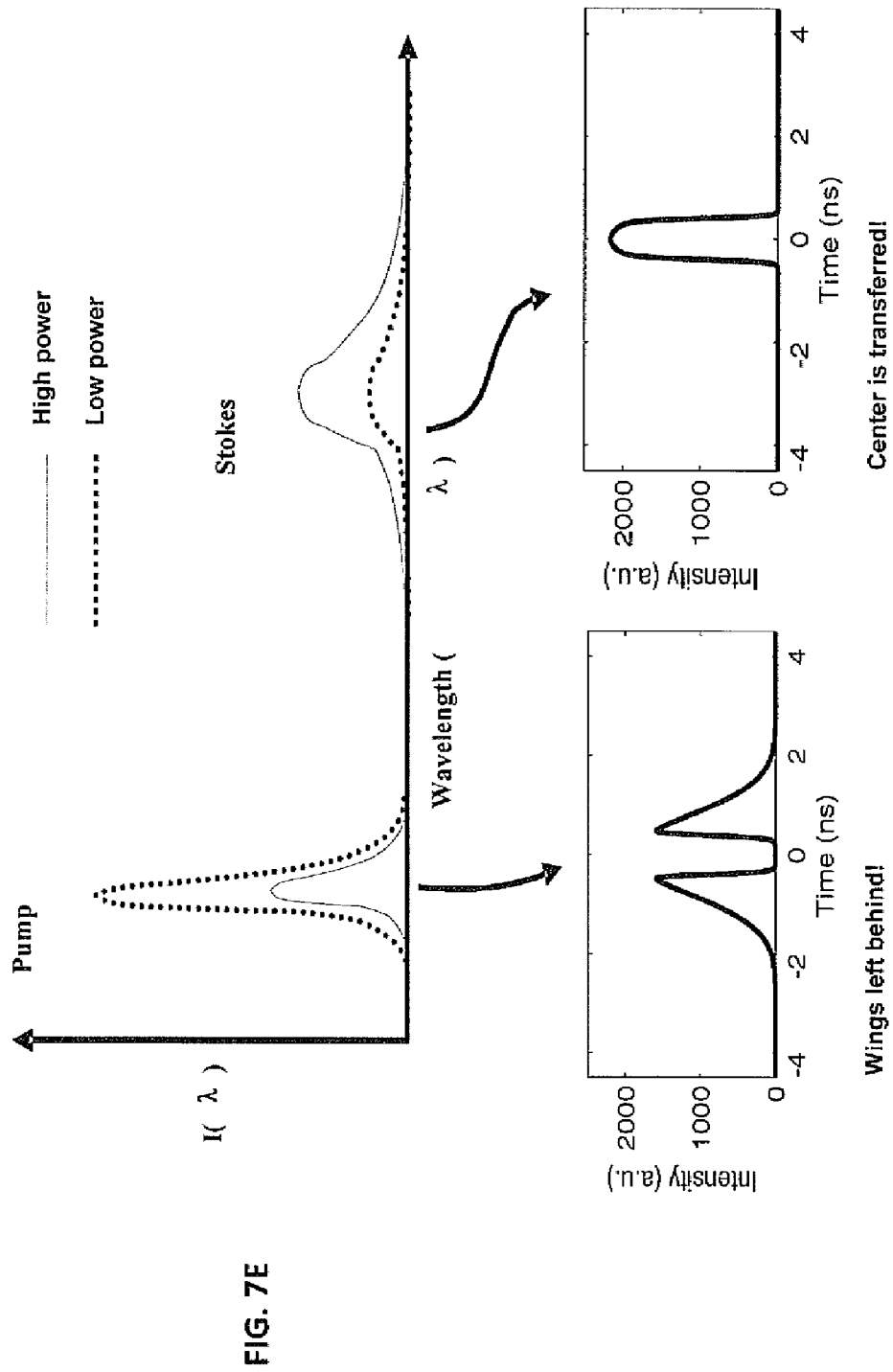

Also, these simulations agree well with measurements of the pulse shape seen in FIGS. 7A-7D. FIGS. 7A-7B show the pulse profiles measured before and after first order cascaded Raman power transfer. FIGS. 7C-7D show simulated pulse profiles under similar conditions. FIGS. 7E-7G schematically show the correspondence of the resulting pulse shapes with different parts of the laser spectrum.

One can see that when the Stokes and pump wavelengths are filtered and measured on the same detector, an apodized version of the incident pulse is found at the Stokes wavelength, indicating that these simulations capture the salient physical characteristics of our experimentally realized laser system.

From the pulse evolution seen in FIGS. 6A-6G, it is clear that the pulse shape plays an important role in dictating the efficiency of power transfer from the pump wavelength to the Stokes wavelength. For instance, since the low intensity portion of the pulse (or wings of the pulse) is generally left behind through this process, it seems plausible that if we reduce the amount of power in the wings of the pulse, we can maximize the power transfer to the Stokes wavelength. It turns out that this is indeed the case.

Figure 8A:
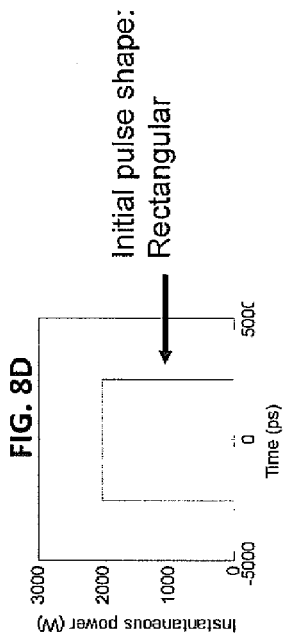
FIG. 8A-8F are graphs illustrating a comparison of the simulated pulse profiles and conversion efficiencies for both Gaussian and rectangular pulse profiles.
Figure 8B:
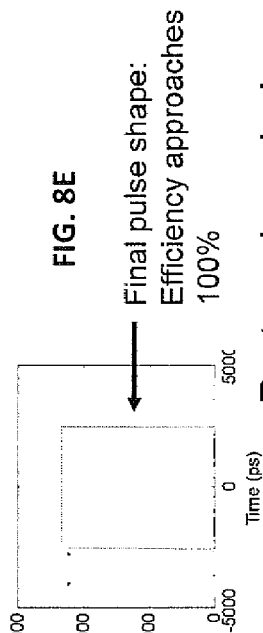

Temporal simulations show us the pulse shapes produced at the pump wavelength, the $1^{st}$ order Stokes order, and the $2^{nd}$ order stokes order at the output of a nonlinear fiber. These simulated pulse profiles are seen in FIGS. 8A-8F. FIG. 8A shows the incident pulse shape and FIG. 8B shows the overlay of the resulting pulse shapes of the pump, $1^{st}$ order, and $2^{nd}$ Raman orders after some propagation in a nonlinear fiber which posses a nonzero Raman gain coefficient. One can see that the center of the pulse is transferred to the $2^{nd}$ Raman order, while different portions of the wings of the pulse remain at the pump and $1^{st}$ Raman order.

Figure 8C:
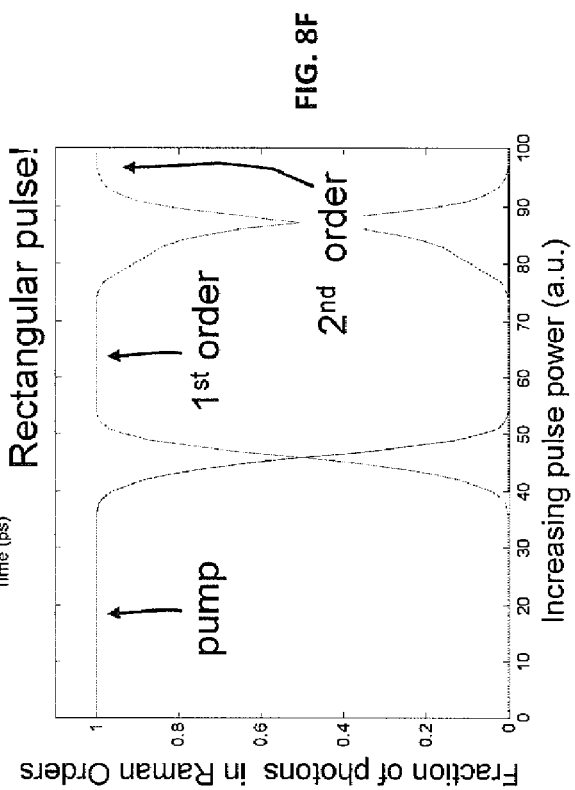

If the power contained in each order as a function of power incident in this system is integrated, one can see the efficiency curve of FIG. 8C. Note the similarity between FIG. 8C and FIG. 4B. One can see that for low powers, all of the power resides in the pump pulse, and as the power increases, some fraction of the power is transferred to the $1^{st}$ and $2^{nd}$ Raman orders. It is noteworthy that the maximum fraction of the laser power that is transferred to either the $1^{st}$ or $2^{nd}$ stokes orders doesn't exceed 70%.

Figure 8D:
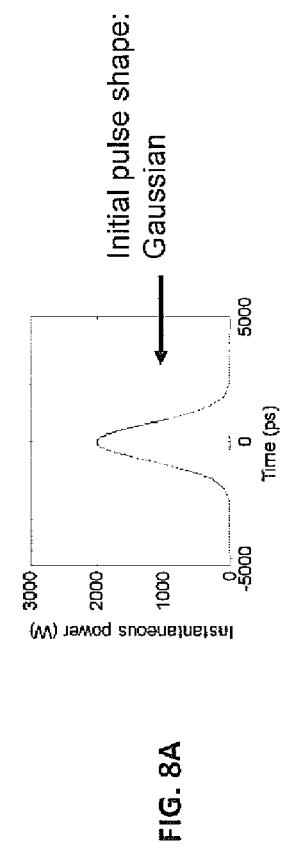
Figure 8E:
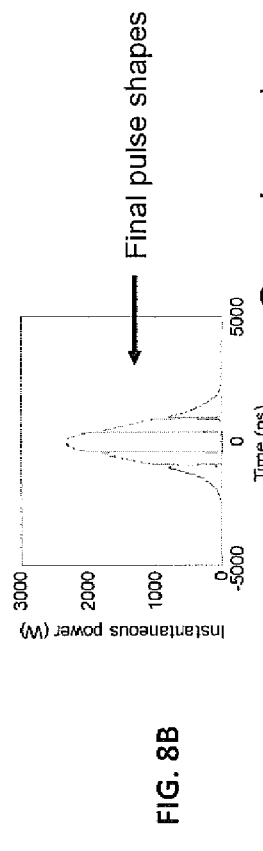
Figure 8F:
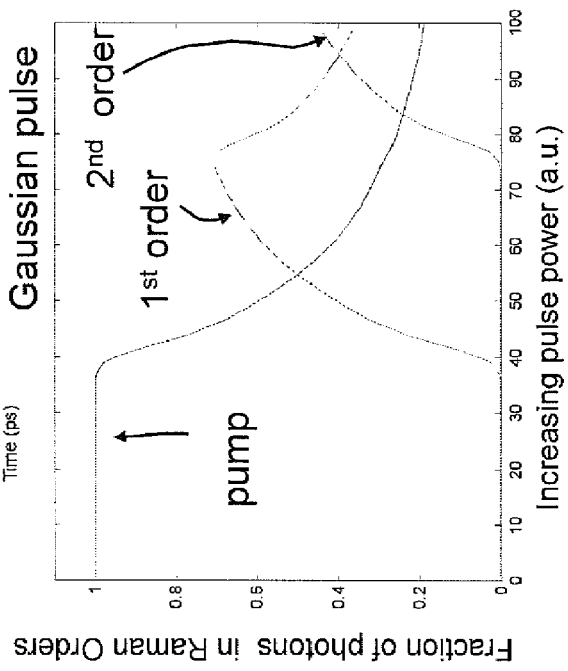

To examine the impact of pulse shape on the efficiency of transfer to each Raman order, identical simulations are carried out for the case when the wings of the pulse are negligible (i.e. the case of a rectangular pulse). If the initial pulse shape is assumed to be rectangular, as seen in FIG. 8D, nonlinear evolution of the system reveals that, essentially 100% of the incident power is transferred to both the $1^{st}$ and the $2^{nd}$ Raman orders (for different powers), as seen in FIG. 8E. The traces corresponding to the pump wavelength (blue) and first stokes orders (red) show that essentially no portion of the pulse remains at these shorter wavelength bands. The efficiency of power transfer is displayed in a more quantitative fashion through FIG. 8F, which show the integrated fraction of power in each order as the pulse power is increased from zero. One can see that the efficiency indeed approaches 100%, indicating that pulse shape is the essential characteristic of importance which limits the efficiency of this process. Note that these simulations incorporate the effects of four-wave mixing, self-phase modulation and cross-phase modulation as well as Raman gain.

Through examination of the pulse shape, and its effect on the efficiency of spontaneous Raman transfer, one can see that a fundamental barrier to achieving 100% photon yield through the spontaneous cascaded Raman process is attributable to the pulse shape used to drive the nonlinear system. In conclusion, one can see that it is optimal to engineer a pulse with as little power distributed to the low-power portion of the pulse wings as is possible (i.e. a rectangular pulse).

Although the present invention has been shown and described with respect to several preferred embodiments thereof, various changes, omissions and additions to the form and detail thereof, may be made therein, without departing from the spirit and scope of the invention.

What is claimed is:

1. A laser structure comprising:
   a pulsed source producing a pulsed signal having a pulse-shape that is flat, wherein said pulsed source is amplified through a first stage of erbium doped fiber amplification to increase the average power of said pulsed signal before said pulsed signal is selectively spectrally filtered, which provides for sufficient power to saturate a second stage of erbium doped fiber amplification to yield an amplified spontaneous emission component; and
   one or more optical fiber structures receiving said pulsed signal and performing Raman amplification, said pulsed signal is used to excite in the one or more optical fiber structures possessing normal chromatic dispersion, which acts as a nonlinear system for efficient mid-infrared spectral generation.

2. The laser structure of claim 1, wherein said pulsed signal comprises a pulse spectrum being spectrally narrower than the Raman gain associated with the Raman amplification.

3. The laser structure of claim 1, wherein said pulsed signal comprises a temporal shape being flat at their peak-power, with minimal power distributed to wings of the pulse signal.

4. The laser structure of claim 1, wherein said one or more optical fibers are cascaded together to achieve wavelengths via spontaneous cascaded Raman process.

5. The laser structure of claim 1, wherein said one or more optical fibers comprise a nonlinear element to generate Raman gain.

6. The laser structure of claim 1, wherein said one or more optical fibers comprise normal dispersion over wavelengths of use.

7. The laser structure of claim 1, wherein said one or more optical fibers comprise glass, semiconductor, or polymer.

8. The laser structure of claim 1, wherein said one or more optical fibers comprise concatenated fibers or waveguides of different geometries and materials.

9. The laser structure of claim 1, wherein said pulse signal is generated by the pulsed source by modulation internally or externally.

10. The laser structure of claim 9, wherein said pulsed source uses gain modulation, electro-optic, acoustooptic, electroabsorption, passive or active Q-switching, mode-locking for internal or external modulation.

11. A method of performing Raman amplification comprising:
    providing a pulsed source producing a pulsed signal having pulse-shape that is flat, wherein said pulsed source is amplified through a first stage of erbium doped fiber amplification to increase the average power of said pulsed signal before said pulsed signal is selectively spectrally filtered, which provides for sufficient power to saturate a second stage of erbium doped fiber amplification to yield an amplified spontaneous emission component;
    arranging one or more optical fiber structures to receive said pulsed signal, said pulsed signal is used to excite in the one or more optical fiber structures possessing normal chromatic dispersion, which acts as a nonlinear system for efficient mid-infrared spectral generation.

12. The method of claim 11, wherein said pulsed signal comprises a pulse spectrum being spectrally narrower than the Raman gain associated with the Raman amplification.

13. The method of claim 11, wherein said pulsed signal comprises a temporal shape being flat at their peak-power, with minimal power distributed to wings of the pulse signal.

14. The method of claim 11, wherein said one or more optical fibers are cascaded together to achieve wavelengths via spontaneous cascaded Raman process.

15. The method of claim 11, wherein said one or more optical fibers comprise a nonlinear element to generate Raman gain.

16. The method of claim 11, wherein said one or more optical fibers comprise normal dispersion over wavelengths of use.

17. The method of claim 11, wherein said one or more optical fibers comprise glass, semiconductor, or polymer.

18. The method of claim 11, wherein said one or more optical fibers comprise concatenated fibers or waveguides of different geometries and materials.

19. The method of claim 11, wherein said pulse signal is generated by the pulsed source by modulation internally or externally.

20. The method of claim 19, wherein said pulsed source uses gain modulation, electro-optic, acoustooptic, electroabsorption, passive or active Q-switching, mode-locking for internal or external modulation.

* * * * *